(12) United States Patent
Tucker

(10) Patent No.: US 11,260,603 B2
(45) Date of Patent: Mar. 1, 2022

(54) HEAT SEAL JAWS WITH ASYMMETRIC TEETH

(71) Applicant: Frito-Lay North America, Inc., Plano, TX (US)

(72) Inventor: Steven Tucker, Plano, TX (US)

(73) Assignee: Frito-Lay America, Inc., Plano, TX (US)

(*) Notice: Subject to any disclaimer, the term of this patent is extended or adjusted under 35 U.S.C. 154(b) by 222 days.

(21) Appl. No.: 16/591,780

(22) Filed: Oct. 3, 2019

(65) Prior Publication Data

US 2021/0101348 A1 Apr. 8, 2021

(51) Int. Cl.
*B32B 7/00* (2019.01)
*B29C 65/00* (2006.01)
*B29C 65/18* (2006.01)

(52) U.S. Cl.
CPC .......... *B29C 66/8141* (2013.01); *B29C 65/18* (2013.01)

(58) Field of Classification Search
USPC ............................................. 156/581, 583.1
See application file for complete search history.

(56) References Cited

U.S. PATENT DOCUMENTS

| | | | |
|---|---|---|---|
| 3,948,720 A | 4/1976 | Reil | |
| 4,582,555 A | 4/1986 | Bower | |
| 4,682,976 A | 7/1987 | Martin et al. | |
| 4,961,302 A | 10/1990 | Davis | |
| 5,021,117 A | 6/1991 | Boeckmann | |
| 5,076,040 A * | 12/1991 | Davis | B29C 66/81435 53/551 |
| 5,419,801 A * | 5/1995 | McDonald | B29C 66/1122 156/581 |
| 6,562,166 B2 | 5/2003 | Molander et al. | |
| 7,348,525 B2 | 3/2008 | Kupfer et al. | |
| 8,176,713 B2 | 5/2012 | Eberhardt | |
| 9,452,853 B2 | 9/2016 | Doll | |
| 10,308,379 B2 | 6/2019 | Bierschenk et al. | |
| 2019/0241297 A1 | 8/2019 | Brenkus | |

FOREIGN PATENT DOCUMENTS

| | | |
|---|---|---|
| DE | 10019288 | 10/2001 |
| EP | 0572270 | 12/1993 |
| JP | 2010280076 | 12/2010 |
| JP | 5684596 | 3/2015 |
| JP | 2019023094 | 2/2019 |
| WO | 2010145667 | 12/2010 |

OTHER PUBLICATIONS

International Search Report and Written Opinion dated Dec. 7, 2020 in PCT/US2020/049646.

* cited by examiner

*Primary Examiner* — James D Sells
(74) *Attorney, Agent, or Firm* — Barnes & Thornburg LLP; G. Peter Nichols

(57) ABSTRACT

A pair of mating sealing jaws for forming a seal between opposing heatsealable surfaces includes a first jaw and a complementary second jaw. Each jaw has a sealing surface that includes at least two peaks separated by a valley. Each peak includes a first face and a second face. A phantom line bisecting the valley defines a first angle between the phantom line and the first face and defines a second angle between the phantom line and the second face such that the first angle differs from the second angle.

8 Claims, 4 Drawing Sheets

FIG. 5

HEAT SEAL JAWS WITH ASYMMETRIC TEETH

This disclosure relates to food packages and forming equipment, particularly mating sealing jaws for use in forming such packages.

Many commodities are packaged on form, fill, and seal packaging machines. Packaging pouches are formed on these machines from rolls of material such as polymeric and metal foil films or combinations of the same. The pouches are formed, filled, sealed and then disconnected from an advancing stream of pouches being formed on the packaging machine.

Typically one or more of the layers of the film that will form the inside of a pouch is engineered by the film manufacturer such that it will soften and flow when subjected to heat and pressure. Both the side seals and the cross seals of a form, fill and seal pouch packaging machine heat and pressurize a front and back film together to adhere the corresponding films to one another. Typically during the heat and pressurization by the seals, the interior layers of the packaging film soften and flow such that they adhere to one another to seal the front and back films together to form a pouch.

To augment the seal between the front and back films, typically the sealing surfaces of the seal bars, whether they be side seals or cross seals are knurled with a "saw tooth" or "square wave" pattern. This stretches the films about the area in which they are sealed together. This stretching increases the surface area of the seal between the films and to some extent mechanically interlocks the front and back films to each other.

The packaging film is most commonly a heat sealable polymeric composition. In the heat sealing process, there are several variables, but significant among these are the applied pressure of the jaws, the dwell time (i.e. the time that the pressure is applied) and the seal temperature. The seal temperature is generally determined by the packaging material. But, the applied pressure and the dwell time are parameters that an operator can manipulate. It will be appreciated that there is a relationship between the applied pressure and the dwell time, such that it is generally desired to manipulate both so that a greater number of packages can be produced.

SUMMARY

According to one aspect of the disclosure, a pair of mating sealing jaws for forming a seal between opposing heatsealable surfaces includes a first jaw and a second jaw having a sealing surface complementary to the first jaw sealing surface. As the opposing heatsealable material traverses the pair of mating sealing jaws, the jaws close intermittently to form a seal.

The first jaw has a sealing surface that includes at least two peaks (ridges) separated by a valley (groove). Each peak includes a first face and a second face. A phantom line bisecting the valley defines a first angle between the phantom line and the first face and defines a second angle between the phantom line and the second face. The first angle differs from the second angle. In some instances, the difference between the first angle and the second angle ranges from about 10° to about 30°.

In one embodiment, the jaws include complementary knife slots. In some embodiments where a knife slot is present, the sealing surface of the first jaw has a profile on a first side of the knife slot that is a mirror image of the sealing surface on the second side of the knife slot.

In some instances, the first face of each peak defines a leading face and the second face of each peak defines a trailing face. Where a knife slot is provided, on the first side of the knife slot, the first angle will be larger than the second angle and on the second side of the knife slot, the first angle will be smaller than the second angle. Because the second jaw has a sealing surface that is complementary to the sealing surface of the first jaw, on the first side of the knife slot, the first angle will be smaller than the second angle and on the second side of the knife slot, the first angle will be larger than the second angle.

Other aspects, embodiments and features of the invention will become apparent from the following detailed description of the invention when considered in conjunction with the accompanying drawings. The accompanying figures are not intended to be drawn to scale. In the figures, each identical, or substantially similar components that are illustrated in various figures are generally represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The following description accompanies the drawings, all given by way of non-limiting examples that may be useful to understand how the described process and system may be embodied.

DESCRIPTION

Figure 1:
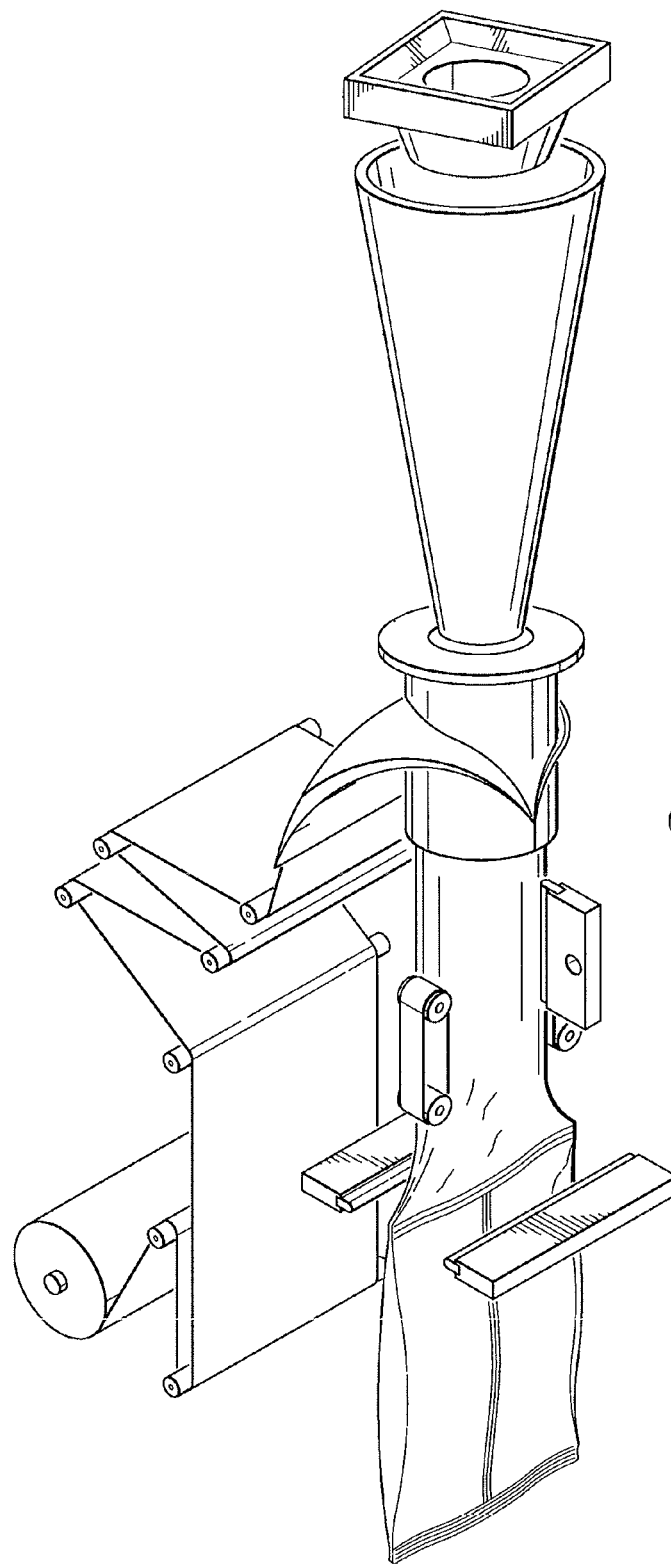
FIG. 1 is a perspective view of a prior art filling apparatus.

FIG. 1 shows a typical vertical form, fill, and seal packaging machine. This type of machine forms bags from film stored on a roll (not shown) and drawn along a film path that extends through a set of tensioners, and over a forming collar that allows the film to wrap around the outer surface of a former. The film path is a predetermined set of positions along which film travels, e.g., a path taken by film through the machine as the film is manipulated from a generally planar form factor to a filled bag. The film is drawn along the length of the former by a set of pull belts while vertical sealer seals the longitudinal edges of the film together to form a tube of film. Transverse seals are formed in the tube of film by the mating sealing jaws described below and which are located downstream from the pull belts and on opposite sides of the film path.

In operation, partially formed bags are filled with product that are first weighed and then passed through a funnel and then the former before being deposited in a partially formed bag. The partially formed bag, now filled with product, is sealed on the upstream end by the mating sealing jaws and detached from the tube to form the bag filled with food product. In one embodiment, the mating sealing jaws are configured to receive a cutter or knife that separates a downstream bag from the upstream tube of film when the transverse seal is formed, or shortly after the transverse seal is formed.

Figure 2:
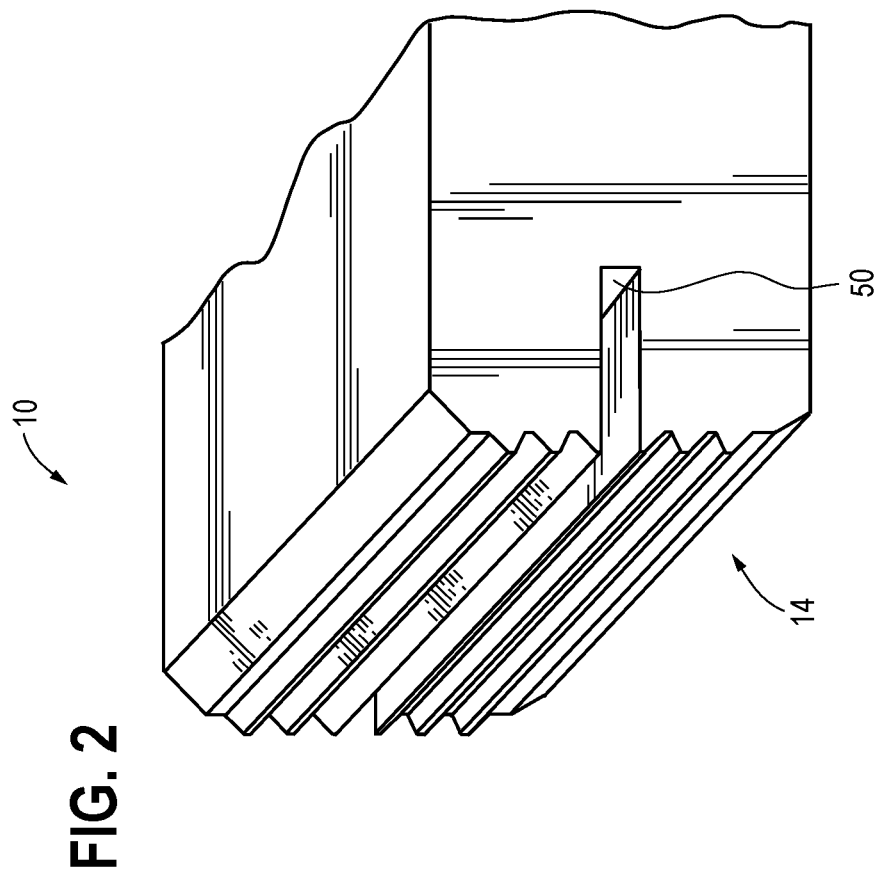
FIG. 2 is an isometric view of an embodiment of a pair of mating sealing jaws.
Figure 2:
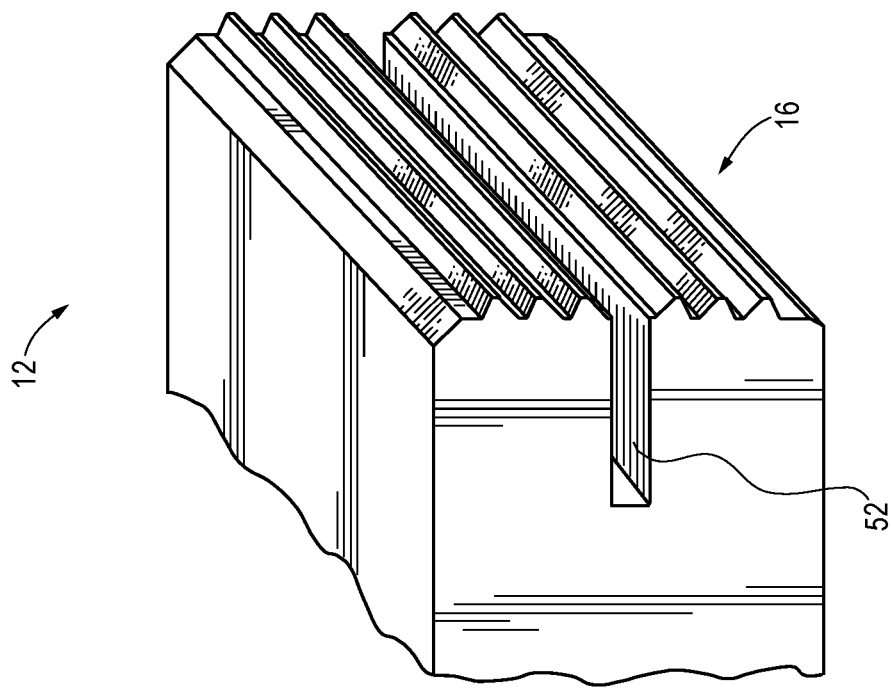

Turning now to FIG. 2, a pair of mating heat sealing jaws that are used to form a seal between opposing heatsealable surfaces is shown. More specifically, a first sealing jaw 10 is disposed on a first side of the film path F and a second sealing jaw 12 is disposed on a second (opposite) side of the film path and oriented to oppose the first sealing jaw 10. The first jaw 10 has a first sealing surface 14 and the second jaw 12 has a second sealing surface 16 with the first and second sealing surfaces being complementary to each other. Each jaw has a respective and complementary slot 50, 52 configured to receive a knife (not shown) to separate a formed package from a following to-be-formed package.

Figure 3:
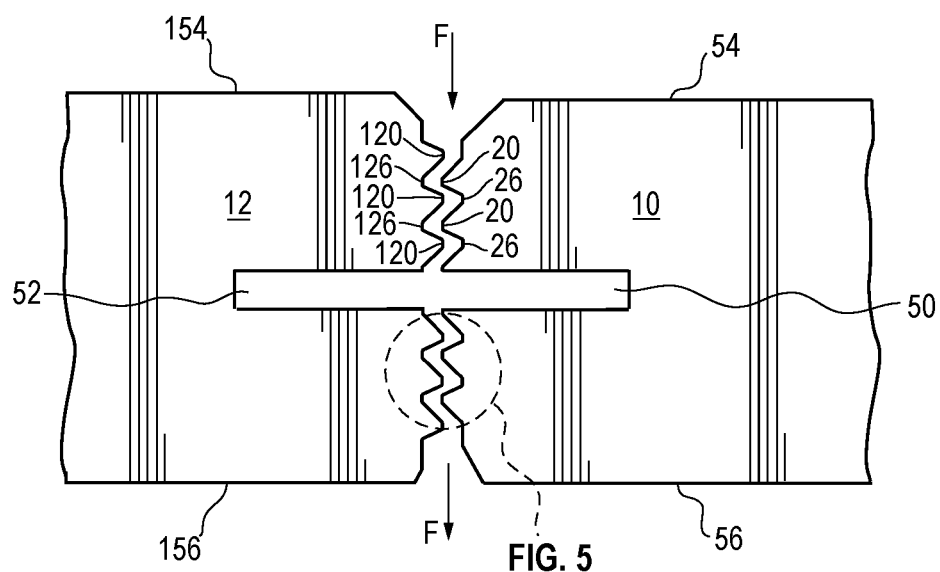
FIG. 3 is a side view of the pair of mating sealing jaws shown in FIG. 2, with the two jaws brought together in opposed, parallel alignment and depicting one embodiment of peaks and valleys.
Figure 4:
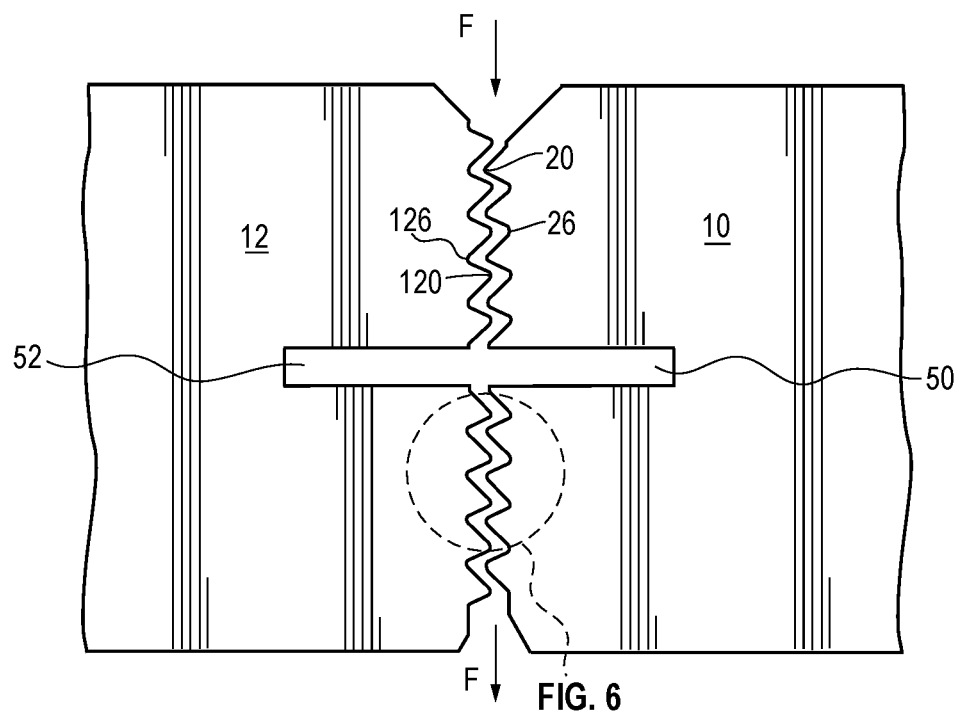
FIG. 4 is a side view of another embodiment of a pair of mating sealing jaws, with the two jaws brought together in opposed, parallel alignment and depicting another embodiment of peaks and valleys.

Referring now to FIG. 3, one embodiment of a pair of mating heat sealing jaws is shown. The structure of each jaw will be described generally with reference to the first jaw 10 since it should be appreciated that the second jaw 12 has a complementary structure. As noted above, the first jaw 10 has a first sealing surface 14 that is provided with at least two peaks 20 (may also be referred to a ridges or lands) that are separated by a valley 26 (may also be referred to as a groove). While FIG. 3 shows that the first jaw 10 has two peaks 20 (and the second jaw 12 has three peaks 120), it will be appreciated that the sealing surfaces may be provided with a greater number of peaks. For example, FIG. 4 shows another embodiment of the mating sealing jaws where the first jaw 10 has four peaks 20 (and the second jaw 12 has five peaks 120). One will understand that by providing a greater number of peaks and valleys, the area of the package that is sealed will be greater as compared to jaws having a lesser number of peaks and valleys and thus the amount of film used to form a package will be greater.

Turning back to FIG. 3, each peak 20 of the first jaw 10 has a first face 30 and a second face 34. In this regard, it will be appreciated that as the opposing heatsealable surfaces approach in a film direction F and traverse the pair of mating heat sealing jaws, the first face 30 may be considered to be a leading face 32 and the second face may be considered to be a trailing face 34.

Similarly, each peak 120 of the second jaw 12 has a first face 130 and a second face 134. In this regard, it will be appreciated that as the opposing heatsealable surfaces approach and traverse the pair of mating heat sealing jaws, the first face 130 may be considered to be a leading face 132 and the second face may be considered to be a trailing face 134.

The first jaw 10 is provided with a first knife slot 50 and the second jaw 12 is provided with an opposed second knife slot 52 both of which are configured to receive a knife (not shown) that will separate a completed package from a to-be-completed package. Generally and as shown in FIG. 3, the first and second knife slots 50, 52 are provided at about the middle of the first and second jaws, respectively. Accordingly and referring to the first jaw 10, on a first side 54 of the first knife slot 50 (the leading portion of the first jaw 10, in the direction of film travel F), two peaks 20 are provided and on a second side 56 of the first knife slot 50 (the trailing portion of the first jaw 10, in the direction of film travel), two peaks 20 are provided.

In a similar manner, referring to the second jaw 12, on a first side 154 of the second knife slot 52 (the leading portion of the second jaw 12, in the direction of film travel F), three peaks 120 are provided and on a second side 156 of the second knife slot 52 (the trailing portion of the second jaw 12, in the direction of film travel F), three peaks 120 are provided. Because the first jaw 10 and the second jaw 12 are complementary, it will be appreciated that when the first and second jaws are advanced or moved toward each other, the peaks 20 on the first sealing surface 14 approach the valleys 126 on the second sealing surface 16 and vice versa.

Figure 5:
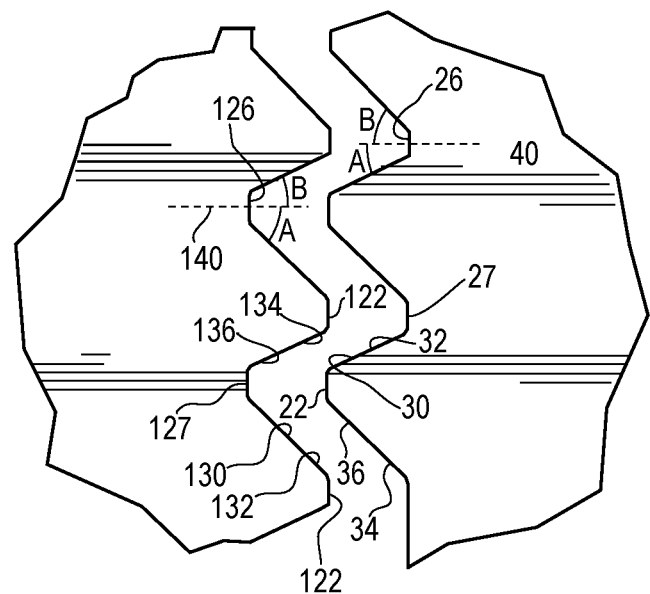
FIG. 5 is a shows a magnified portion of the mating sealing jaws of FIG. 3.
Figure 6:
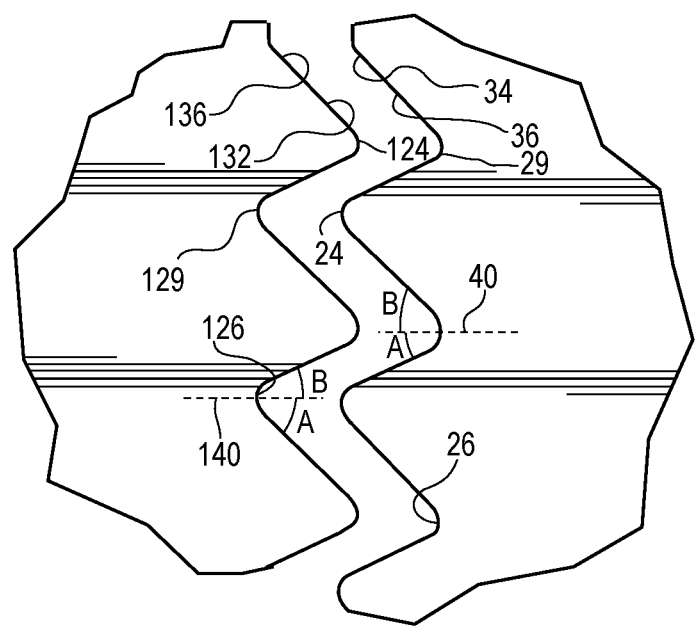
FIG. 6 is a shows a magnified portion of the mating sealing jaws of FIG. 4.

Turning now to FIG. 5, a magnified portion of the first and second sealing jaws shown in FIG. 3 is shown. It will be appreciated that the top of each peak 20, 120 is flat 22, 122 to provide a trapezoidal shape for each peak 20. Similarly, each valley 26, 126 is flat 27. 127. Alternatively and best shown in FIG. 5, which is a magnified portion of the first and second sealing jaws shown in FIG. 4, the top of each peak 20, 120 is curved 24, 124. Similarly, each valley 26, 126 is curved 29,129.

As noted previously, each peak 20, 120 has a first face 30. 130 (leading face 32, 132) and a second face 34, 134 (trailing face 36, 136). A phantom line 40, 140 that bisects the valley 26, 126 (i.e., divides the valley 26 into two equal parts) defines a first angle A that is an angle created by the phantom line 40, 140 and the first face 30, 130 and defines a second angle B that is an angle created by the phantom line 40, 140 and the second face 34, 134.

The first face 30, 130 and the second face 34, 134 are formed such that the first angle A differs from the second angle B. In some instances, the difference between the first angle A and the second angle B ranges from about 10° to about 30° and in some instances differs by about 20°.

It will be understood that the peaks and valleys on the first side 54, 154 of the knife slot 50, 52 form the bottom of the package that the peaks and valleys on the second side 56, 156 of the knife slot 50, 52 form the top of a preceding package. Accordingly, it is advantageous if the shape profile of the peaks 20, 120 and valleys 26, 126 on the first side 54, 154 of the knife slot 50, 52 is a mirror image of the peaks 20, 120 and valleys 26, 126 on the second side 56, 156 of the knife slot 50, 52.

In this regard, in one embodiment and referring to the first jaw 10, on the first side 54 of the knife slot 50 angle A is larger than angle B. In this instance, angle A ranges from about 25° to about 60°, or from about 35° to about 55°, or from about 40° to about 50° and in some instances is about 45°. Angle B ranges from about 15° to about 35°, or about 20° to about 30° or about 25°.

When the shape profile of the peaks and valleys on the second side 56 of the first knife slot 50 is a mirror image of the shape profile of the peaks and valleys on the first side 54 of the first knife slot 50, angle A is smaller than angle B. In this instance, angle A ranges from about 15° to about 35°, or about 20° to about 30° or about 25°. Angle B ranges from about 25° to about 60°, or from about 35° to about 55°, or from about 40° to about 50° and in some instances is about 45°

As previously explained, the second jaw 12 is complementary to the first jaw. Accordingly, on the first side 154 of the second knife slot 52 angle A is smaller than angle B. In this instance, angle A ranges from about 15° to about 35°, or about 20° to about 30° or about 25°. Angle B ranges from about 25° to about 60°, or from about 35° to about 55°, or from about 40° to about 50° and in some instances is about 45°.

When the shape profile of the peaks and valleys on the second side 156 of the second knife slot 52 is a mirror image of the shape profile of the peaks and valleys on the first side 154 of the second knife slot 52, angle A is larger than angle B. In this instance, angle A ranges from about 25° to about 60°, or from about 35° to about 55°, or from about 40° to about 50° and in some instances is about 45°. Angle B ranges from about 15° to about 35°, or about 20° to about 30° or about 25°.

With the above construction of the peaks and valleys and in particular where the defined angles A and B are asymmetric, it will be appreciated that each peak 20, 120 (land or ridge) will enter the opposing and complementary valley 26, 126 "off-center". It is believed that this arrangement will produce a higher tensile force in those areas where the angle A or B is smaller and, in turn will create a stronger seal. One of skill will appreciate that in this instance the stronger portion of the seal will be the leading edge from the inside of the package.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A pair of mating sealing jaws for forming a seal between opposing heat sealable surfaces comprising:
    a first jaw having a sealing surface that includes at least two peaks separated by a valley, wherein each peak includes a first face and a second face and wherein a phantom line bisecting each valley defines a first angle between the phantom line and the first face and defines a second angle between the phantom line and the second face such that the first angle differs from the second angle; and,
    a second jaw having a sealing surface complementary to the first jaw sealing surface.

2. The sealing jaws of claim 1 wherein a size difference between the first angle and the second angle ranges from about 10° to about 30°.

3. The sealing jaws of claim 1 wherein the first jaw includes a knife slot and the second jaw includes a knife slot opposed to the knife slot of the first jaw.

4. The sealing jaws of claim 3 wherein the sealing surface of the first jaw has a profile on a first side of the knife slot of the first jaw that is a mirror image of the sealing surface on a second side of the knife slot of the first jaw.

5. The sealing jaws of claim 4 comprising, on the sealing surface of the first jaw, at least two peaks separated by a valley on the first side of the knife slot of the first jaw and at least two peaks separated by a valley on the second side of the knife slot of the first jaw.

6. The sealing jaws of claim 5 wherein, as the opposing heatsealable surfaces traverse the sealing jaws, the first face of each peak on the first jaw defines a leading face and the second face of each peak on the first jaw defines a trailing face.

7. The sealing jaws of claim 6 wherein, on the first side of the knife slot, the first angle is larger than the second angle and, on the second side of the knife slot, the first angle is smaller than the second angle.

8. In a pair of mating sealing jaws for forming a seal between opposing heat: sealable surfaces where each jaw has at least two peaks separated by a valley, the improvement wherein a phantom line bisecting each valley defines a first angle between the phantom line and a first face of a peak and defines a second angle between the phantom line and a second face of an adjacent peak such that the first angle differs from the second angle.

\* \* \* \* \*